Oct. 14, 1924.

H. H. MILLER

APPARATUS FOR TREATING LIQUID

Filed May 26, 1920

Inventor:
Harvey H. Miller
by
Geo. B. Pitts
Attorney.

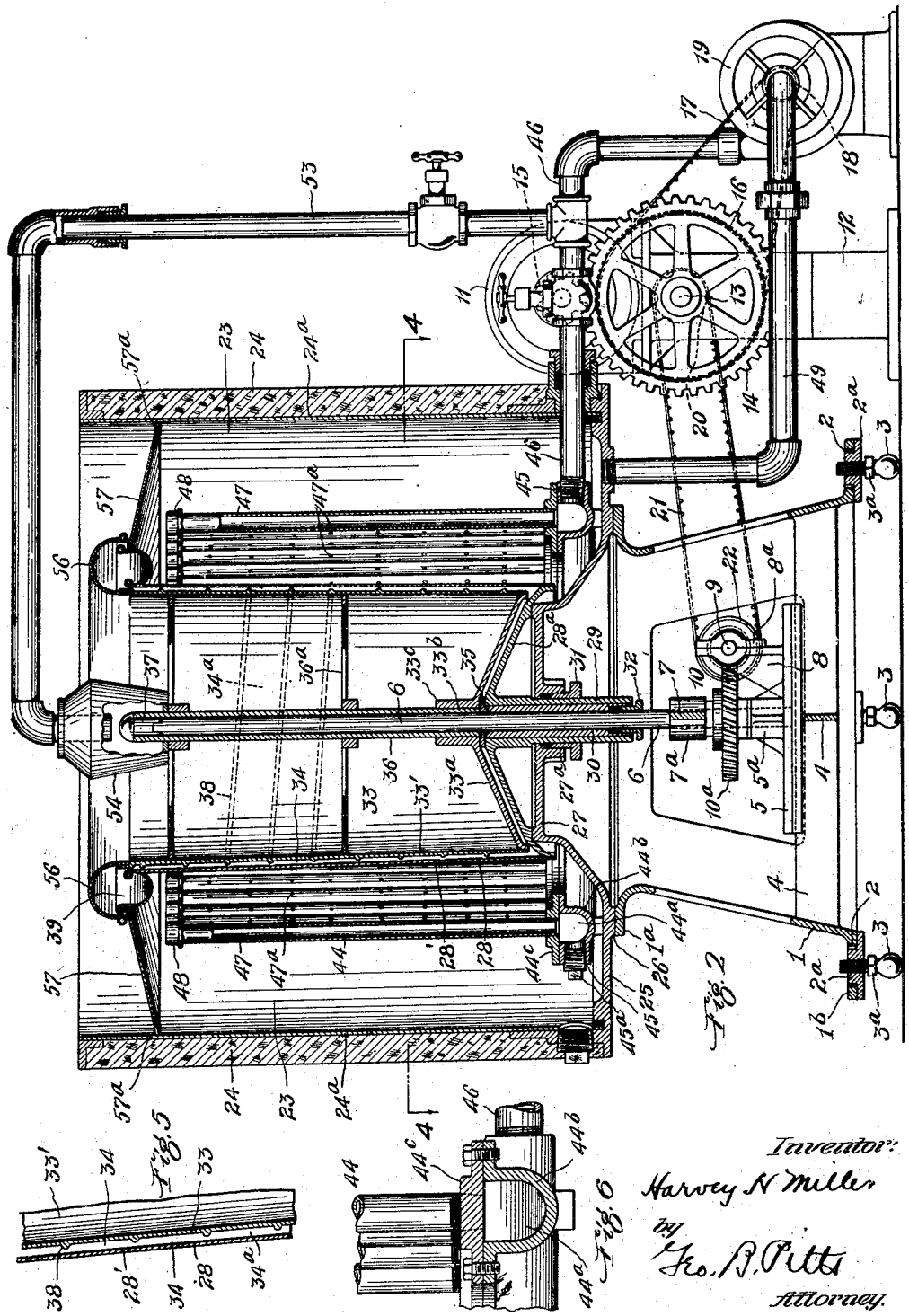

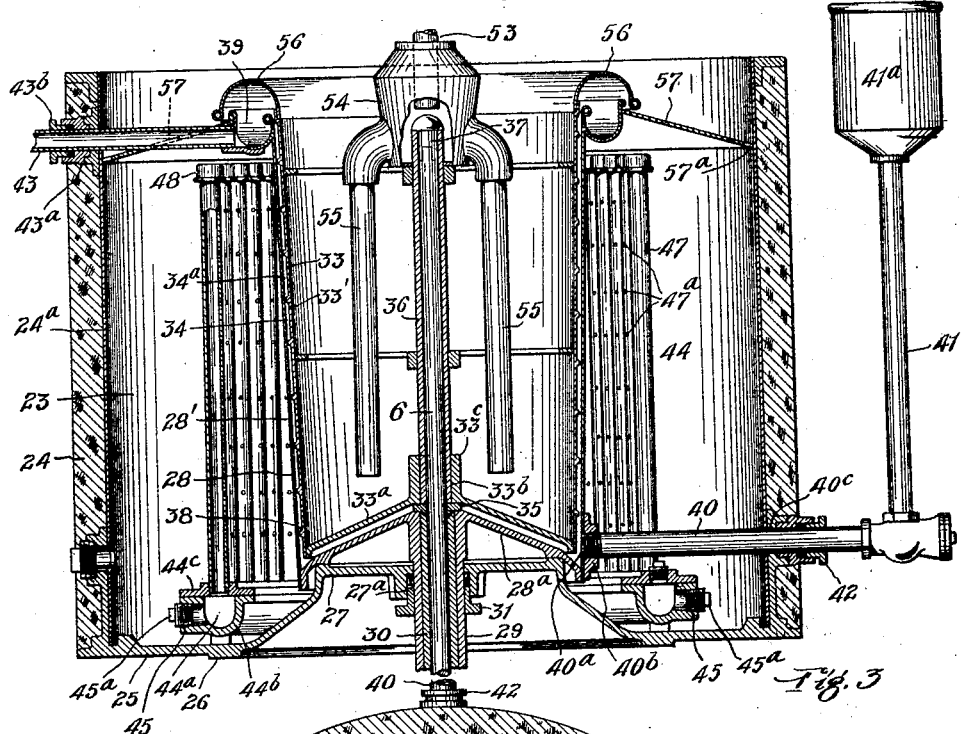
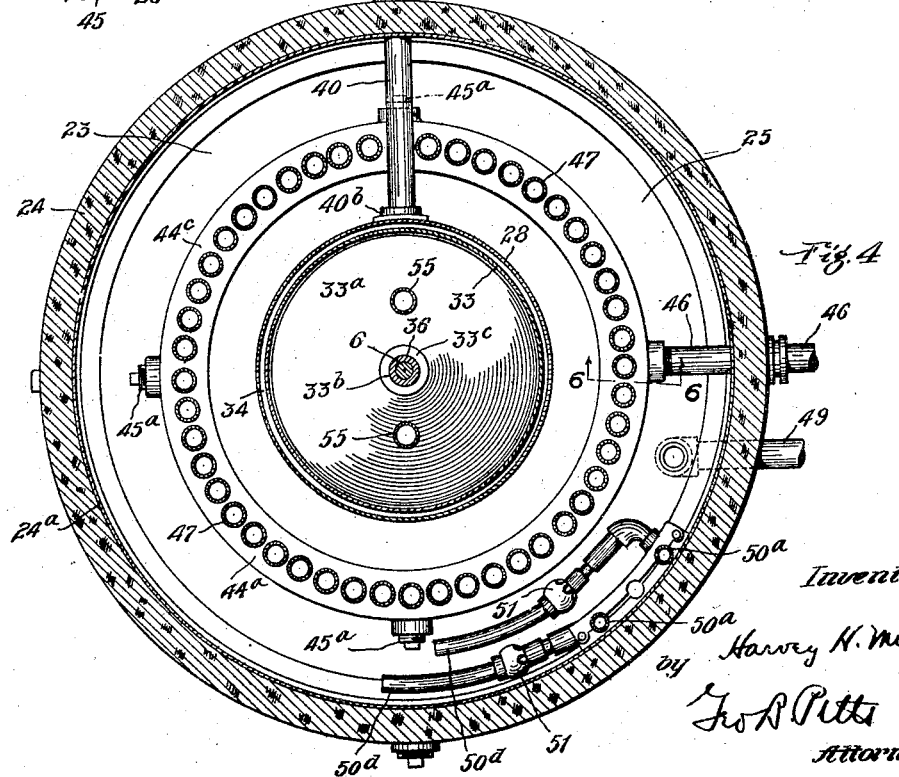

Patented Oct. 14, 1924.

1,511,421

UNITED STATES PATENT OFFICE.

HARVEY H. MILLER, OF CANTON, OHIO, ASSIGNOR TO THE H. H. MILLER INDUSTRIES COMPANY, OF CANTON, OHIO, A CORPORATION OF OHIO.

APPARATUS FOR TREATING LIQUID.

Application filed May 26, 1920. Serial No. 386,252.

*To all whom it may concern:*

Be it known that I, HARVEY H. MILLER, a citizen of the United States, residing at Canton, in the county of Stark and State of Ohio, have invented certain new and useful Improvements in Apparatus for Treating Liquid, of which the following is a specification.

This invention relates to apparatus for treating liquid, more particularly to apparatus for treating milk.

The apparatus is readily adapted either for raising or lowering the temperature of milk; if desired, it may operate to pasteurize the milk as it flows through the apparatus.

One object of the invention is to provide an improved apparatus capable of quickly and readily changing the temperature of a liquid, such as milk, whereby the capacity of the apparatus is greatly increased and the cost of operation materially reduced.

Another object of the invention is to provide a circulation of the temperature changing medium relative to the wall or walls which confine the milk, whereby the temperature of the latter is quickly raised or lowered, as the case may be, to the desired extent.

Another object of the invention is to provide improved means for directing a temperature changing medium against and relative to one wall forming the conduit for the milk, whereby the heat of the temperature changing medium is transmitted to the milk relatively quickly and in an efficient and economical manner.

Another object of the invention is to simplify the construction of apparatus of this character, maintain a uniformity of operation, increase their efficiency, and permit treatment of a large quantity of milk economically and quickly.

Other objects of the invention will be apparent to those skilled in the art to which my invention relates from the following description taken in connection with the accompanying drawings, wherein Fig. 1 is a top plan view of a liquid treating apparatus embodying my invention.

Fig. 2 is a view partly in elevation and partly in section on the line 2—2 of Fig. 1.

Fig. 3 is a fragmentary section on the line 3—3 of Fig. 1.

Fig. 4 is a horizontal fragmentary section on the line 4—4 of Fig. 2.

Figs. 5 and 6 are detail sectional views.

Figure 1:
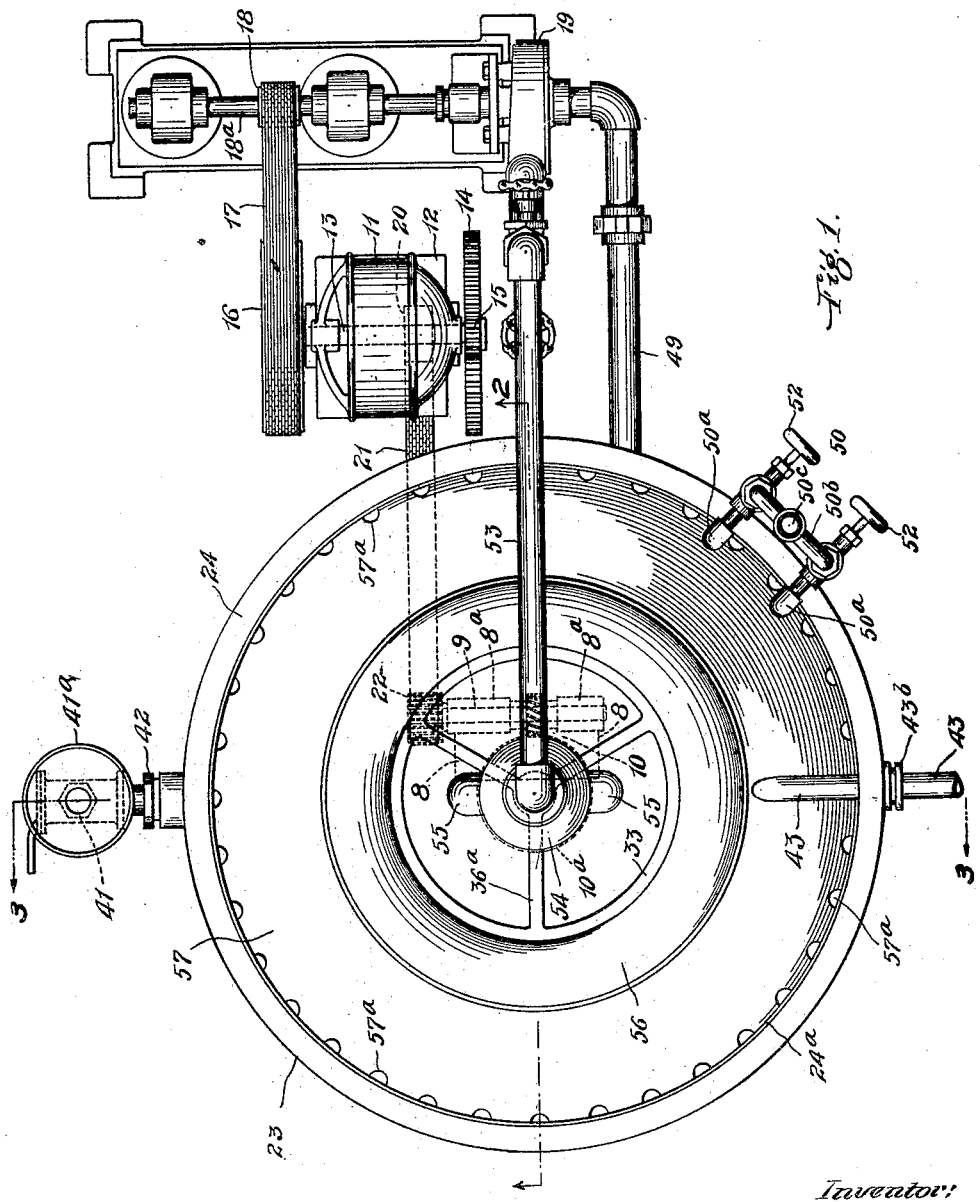

In the following description I will refer to the apparatus shown in the drawings as a heater or pasteurizer for milk; but by circulating a cooling medium, such as cold water or brine for example, instead of hot water, against the wall or walls which confine the milk, the apparatus may be readily used as a cooler.

Referring to the drawings, 1 indicates a supporting member, preferably comprising a conical shaped casting provided at its upper and lower ends with out-turned flanges $1^a$, $1^b$, respectively. The flange $1^b$ is formed with a plurality of uniformly spaced openings 2, in which are secured in any desired manner plates $2^a$. The plates $2^a$ are formed with screw-threaded openings to adjustably receive the screw-threaded shanks of feet 3, which engage the floor and support the member 1 in a horizontal position. The feet 3 have squared portions $3^a$, whereby they can be readily turned to adjust the shanks.

4 indicates a plurality of cross members, preferably arranged at angles to each other, extending between the opposite sides of the supporting member 1. The cross members 4 and supporting member 1 are preferably formed integrally. The cross members 4 serve to strengthen the supporting member 1 and also to support a base 5 provided with a bearing socket $5^a$ for a vertical shaft 6, the purpose of which will be later set forth. 7 indicates a hanger supported on the base 5 and straddling the bearing socket $5^a$. At its upper end, the hanger is formed with a semicircular bearing and provided with a cap $7^a$ which is formed with a semi-circular bearing co-operating with the other semi-circular bearing to support the shaft 6 vertically.

8 indicates a pair of up-standing brackets formed integrally with the base 5 at one side of the socket $5^a$. The brackets 8 and caps $8^a$ secured thereto form bearings for a shaft 9. 10 indicates driving connections between the shaft 9 and shaft 6. These connections preferably comprise a helical gear $10^a$ fixed to the shaft 6 between the socket $5^a$ and bearing portions of the hanger 7 and adjacent cap $7^a$ and a helical pinion fixed to the shaft 9.

11 is a motor—preferably an electric motor—mounted on a support 12. The support 12 is provided with suitable bearings for a power shaft 13 which extends beyond the opposite side walls of the support 12. At one end the shaft 13 carries a gear 14, which is driven by a pinion 15 on the adjacent end of the motor shaft; at its opposite end it carries a pulley 16 for a belt 17, which runs around a pulley 18 on the shaft $18^a$ of a pump 19, the purpose of which will be later set forth. Between the side walls of the support 12 is provided a pulley 20 over which runs a belt 21 that is belted over a pulley 22 on the shaft 9 to drive the latter.

23 indicates a cylinder having a side wall 24 and a bottom 25. The bottom is provided with an annular seat 26, which engages the flange $1^a$ of the supporting member 1. Within the seat 26 the bottom 25 is elevated to form a base or support 27 for a cylinder 28. The side wall 24 of the cylinder 23 is preferably formed of material which is a non-conductor of heat. The inner surface of the side wall is preferably lined with non-corrosive metal or other suitable material, as shown at $24^a$. The bottom 27 of the cylinder support is formed with an opening $27^a$ through which extends the shaft 6 and tubular member 29, the latter preferably being formed integrally with and depending from the bottom $28^a$ of the cylinder 28. 30 indicates a bushing arranged within the tubular member 29. 31 indicates a gland arranged between the bottom 27 and tubular member 29 and 32 indicates a gland arranged between the shaft 6 and bushing 30. As shown in Figs. 2 and 3, the bottom $28^a$ of the cylinder 28 is provided with an annular seat to engage the base 27. The cylinder 23 is relatively large as compared to the size of the cylinder 28 to provide a receptacle for a relatively large quantity of hot water, as shown in the drawings, and for other reasons to be referred to later.

33 indicates a cylinder arranged within and concentric to the cylinder 28 and of a size to form between its side wall $33'$ and the side wall $28'$ of the cylinder 28 a relatively thin space 34 for a film of milk. The bottom $33^a$ of the cylinder 33 is preferably spaced from the bottom $28^a$ by a bushing or bearing ring 35, and formed with an opening $33^b$ through which the shaft 6 extends. Surrounding the opening $33^b$ is a hub $33^c$, to which is connected a vertically extending tubular section or sleeve 36. The upper end of the sleeve 36 is connected to and supported centrally of the cylinder by one or more spiders $36^a$. As shown, the shaft 6 extends through the sleeve 36 and is keyed thereto at its upper end by a removable locking device 37, whereby the cylinder 33 will be rotated by the shaft 6.

38 indicates a spiral rib carried by one of the opposing walls of the cylinders 28 and 33. The rib 38, by preference, is shown fixed to the outer surface of the side wall $33'$ of the cylinder 33. The rib 38 runs around the cylinder 33 from its lower end to its top and extends across the film space 34 sufficiently far for it to co-operate with the inner surface of the side wall $28'$ of the cylinder 28 to form a spiral conduit $34^a$ between these walls from the bottom to the top of the film space 34. As the cylinder 33 is rotated, it will be seen that the milk will be caused to flow through the spiral conduit $34^a$, as it rises to the top of the cylinders 28 and 33, and overflows into an annular trough 39 carried by the cylinder 28.

40 indicates a pipe or conduit for supplying milk to be heated to the space between the cylinders 28 and 33. The pipe 40 leads into an opening $40^a$ formed in the side wall $28'$ of the cylinder 28 near its lower end, so that the milk or other liquid supplied is completely treated as it traverses the walls of the cylinders. The inner end of the pipe 40 is preferably screw-threaded into a collar $40^b$ surrounding the opening $40^a$ and fixed to the side wall $28'$ in any well known way. The pipe 40 preferably extends through an opening $40^c$ formed in the side wall 24. The outer end of the pipe 40 is connected to the lower end of a vertical pipe 41, which preferably carries at its upper end a receiver $41^a$ to which the milk is supplied from any suitable source. The pipe 41 is long enough to support the receiver $41^a$ slightly above the trough 39, so that the milk will flow by gravity from the receiver $41^a$, through the pipes 41 and 40 to the lower end of the spiral conduit $34^a$ and then rise to the upper end of the cylinders 28 and 33 and overflow into the trough 39.

42 indicates a gland for the pipe 40 to prevent leakage from the cylinder 23 through the opening $40^c$.

43 indicates a pipe for conveying away the milk from the trough 39. The pipe 43 is connected to the trough in any desired manner and extends through an opening $43^a$ formed in the side wall 24. $43^b$ indicates a gland arranged between the discharge pipe 43 and the walls of the opening $43^a$.

44 indicates means for spraying or squirting the temperature changing medium on or against one side wall forming the spiral conduit $34^a$ for the milk. When the apparatus is used as a heater or pasteurizer, I prefer to use hot water, which may be maintained at the desired temperature by any suitable means, such for example by steam, as will be later described. For convenience in manufacture, as well as for assembly and disassembly purposes in cleaning, I prefer to position the spraying means 44 in the cylinder 23 and extend it entirely around the cylinder 28. Of the spraying means 44, 44ª indicates an annular manifold supported on the cylinder bottom 25. The manifold may comprise a conduit section 44ᵇ and a ring shaped cover plate 44ᶜ connected thereto in a liquid tight manner by any suitable means. The conduit section 44ᵇ is provided with a plurality of inlet openings 45 to permit the connection of a supply pipe 46 thereto in a ready manner according to the conditions present where installation of the apparatus takes place. Those inlet openings which are not used may be closed by screw plugs 45ª. 47 indicates a plurality of up-standing pipes connected to the cover plate 44ᶜ and preferably uniformly spaced thereon around the cylinder 28. The pipes 47 are closed at their upper ends, preferably by screw caps 48. Each of the pipes 47 is formed with a row or rows of jet openings or apertures 47ª on that side toward or adjacent the cylinder side wall 28′, so that the water which is forced through the supply pipe 46 and manifold 44ª to the pipes 47 may be sprayed against or upon the wall 28′ to heat the latter and thus heat and pasteurize the milk flowing through the spiral conduit 34ª. The supply pipe 46 is connected to the discharge or delivery opening of the pump 19. The pump 19 may be driven to spray the water with any desired force against the side wall 28′. The water is preferably sprayed against the side wall 28′ at a relatively high rate, so as to effect a relatively rapid change in temperature of the milk, it being understood that the greater the rate of flow of the water against the side wall 28′ the quicker will be the rise in temperature of the milk to or approximating that of the water being sprayed. The water, which is discharged from the pipes 47, collects in the cylinder 23 and then flows back to the pump 19 through a pipe 49 connected to the cylinder bottom 25.

50 indicates means for heating the water that is sprayed against the cylinder 28. These means preferably comprise a pair of steam pipes 50ª, 50ª, connected by a yoke 50ᵇ to a supply pipe 50ᶜ. The pipes 50ª extend downwardly to the bottom 25 and each is connected to a horizontal pipe section 50ᵈ the free ends of which are open. 51 indicates an injector arranged intermediate the ends of each pipe section 50ᵈ. In operation the flow of the steam through the pipes serves to draw water in the cylinder 23 into the pipe sections and discharge it at their free ends, the effect of which is to intermingle the steam with the water and heat the latter. By controlling the valves 52 on the pipes 50ª the water can be sufficiently heated to treat the milk in the desired way.

I prefer to circulate hot water into the cylinder 33 so as to heat the side wall 33′ thereof, and in order that both confining walls for the film of milk flowing through the spiral conduit 34ª may be heated. For this purpose I provide a pipe 53 which is connected to the water supply pipe 46. The pipe 53 leads to a point above and preferably centrally of the cylinder 33. 54 indicates a receiver open at its upper end and arranged to receive the water delivered from the discharge end of the pipe 53. 55 indicates a plurality of discharge pipes connected to the receiver 54 and depending downwardly therefrom. The pipes 55 extend nearly to the bottom of the cylinder 33 so that the water will be discharged near the bottom and be caused to rise to the top of the cylinder. As the top of the receiver 54 is slightly above the top of the cylinder 33, it will be seen that the water will rise therein and flow over its upper edge. The receiver 54 rests upon the upper spider 36ª, it being formed with an opening in its bottom to receive the upper end of the shaft 6, sleeve 36 and locking device 37. The discharge pipes 55 extend through the openings between the arms of the spider 36ª.

56 indicates a guard or flow wall arranged at the upper end of the cylinder 33 and extending over the trough 39. The water flows from the cylinder over the guard without getting into the milk in the trough 39.

57 indicates a combined cover and guide plate for the water overflowing from the cylinder 33. The plate 57 extends around the cylinder 28 within the outer cylinder 23, its inner edge being secured to the outer side wall of the trough 29 in a well known way. The plate is inclined downwardly and outwardly and serves to catch the water flowing over the guard 56 from the cylinder 33 and guide it to its outer edge where the water flows through openings 57ª formed therein into the cylinder 23 to be reheated and returned to the pump 19. The openings 57ª may be provided by serrating the outer edge of the plate. The plate 57 also serves as a cover in that it prevents any steam or vapor rising from the water in the cylinder 23 or being sprayed from the pipes 47 from contacting with or condensing and the water of condensation getting into the milk flowing into and around the trough 39. As shown, the plate 57 serves to confine the steam in the cylinder and escape thereof through the openings 57ª will be met by the water flowing down the plate 57 and therethrough. By providing relatively small openings for the water to flow through from the cylinder 33 to the cylinder 23, I insure that all steam which would otherwise escape through the openings 57ª will meet with water flowing downwardly to the cylinder 23 and be condensed thereby. The deflecting plate 57 serves also to conduct the water that overflows from the interior of the cylinder 33 beyond or outside the cylindrical series of spray pipes 47 so that such overflow water does not fall upon said pipes or through the jets discharged therefrom. The space in which are located the pipes 55, surrounded by the film space 34, is closed at its bottom but open at the top, with the result that the liquid discharged from the pipes 55 collects therein, filling the space and finally overflowing across the flow wall 56 and onto the deflecting plate 57, which, as has been described, directs it away from the vertically disposed and cylindrically arranged spray pipes 44.

In practice I have found that an apparatus embodying my invention is highly advantageous in that the temperature of the milk can be raised or lowered relatively quickly and for that reason a larger quantity can be treated in a given period of time. I have also found that the expense of operation is materially reduced. By spraying or squirting the hot water in relatively small jets and under pressure against the cylinder side wall 28' a large quantity of the temperature changing medium contacts with substantially all portions of such wall and then immediately flows away therefrom. I am enabled therefore to maintain a substantially uniform supply of hot water of the desired temperature in contact with the milk confining wall and to immediately convey away therefrom that water from which heat has been absorbed. It will be seen therefore that as the hot water flows in relative fine jets under pressure against and then away from the film wall, a large quantity of water and substantially every portion thereof is caused to contact directly therewith in a given period of time, thus insuring transmission to or absorption by the milk of a large quantity of heat, and permitting of a maximum flow of milk through the conduit 34ª at minimum expense. By directing the heating medium under pressure and in streams I prevent the formation of a film of air around the film wall, thus permitting the heat of the water to be readily absorbed by its outer surface for conduction to its inner surface. It will also be seen, from the foregoing description, that the apparatus is simple in construction and may be operated in a continuous manner for an indefinite period.

To those skilled in the art to which this invention relates many alterations in construction and widely differing embodiments and applications of my invention will suggest themselves without departing from the spirit and scope thereof. My disclosures and the description herein are purely illustrative and are not intended to be in any sense limiting.

What I claim is:

1. In apparatus of the class described, the combination of a pair of concentric cylinders arranged to form a film space between their side walls for liquid, means for supplying liquid to one end of the film space and for conveying it away from the other end thereof, and a plurality of perforated pipes extending parallel to the axes of said cylinders and arranged in a series therearound for spraying a temperature changing medium toward and against one of the cylinder side walls to treat the liquid flowing through the film space.

2. In apparatus of the class described, the combination of a pair of concentric cylinders arranged to form a film space between their side walls for liquid, means for supplying liquid to one end of the film space and for conveying it away from the other end thereof, and means for spraying a temperature changing medium against one wall of the said film space, including a plurality of perforated pipes arranged adjacent to each other and to the said side wall, a manifold with which the perforated pipes individually connect, and means for supplying the manifold with the temperature changing medium.

3. In apparatus of the class described, the combination of a pair of concentric cylinders arranged to form a film space between their side walls for liquid, means for supplying milk to one end of the film space and for conveying it away from the other end thereof, a plurality of perforated pipes arranged in a cylindrical series surrounding the said film space and concentric therewith and arranged to discharge a temperature changing medium against a wall of the film space, a manifold with which the lower ends of the perforated pipes individually connect, and means for supplying under pressure a temperature changing medium to the said manifold.

4. In apparatus of the class described, the combination of a pair of cylinders the side walls of which are arranged to form a liquid film space between them, and a series of vertical perforated pipes arranged in an annular row in spaced relationship in juxtaposition to one of said side walls for spraying a temperature changing medium thereon.

5. In apparatus of the class described, the combination of a pair of cylinders arranged one within the other and co-operating to form a film space between their side walls, a separate cylinder surrounding said pair of cylinders, a manifold arranged within the last mentioned cylinder, an annular series of pipes connected to said manifold and extending longitudinally of said pair of cylinders in juxtaposition to the side wall of the outer one thereof, said pipes being formed with apertures in their walls opposing the side wall of the outer cylinder, and means for supplying a temperature changing medium through said manifold to said pipes, whereby the latter operate to spray the temperature changing medium toward or against the said adjacent side wall.

6. In an apparatus of the class described, the combination of a pair of concentric walls arranged to form a film space between them, and to surround a space with a closed bottom but open at the top, means for causing a liquid to flow through such film space, means for spraying a temperature changing medium against the outer wall of the film space, means for supplying a liquid temperature changing medium to the space surrounded by the film space, a flow wall over which the liquid medium may flow from the upper edge of the space, and deflecting means arranged to receive the liquid medium from the flow wall and conduct it across and beyond the spraying means that deliver against the said outer wall.

7. In an apparatus of the class described, the combination of a pair of concentric walls arranged to form a film space between them and surround a central space closed at the bottom but open at the top, means for causing a flow of liquid through the said film space, a set of perforated pipes outside of and concentric with the outer wall of the film space, arranged to spray liquid against such wall, means for supplying a temperature changing liquid medium to the central space surrounded by the film space, a flow wall connected with the upper edge of the inner wall of the film space, over which the liquid medium flows from the said central space, and a deflecting plate arranged to receive the liquid from the said flow wall and direct it beyond the concentric set of spray pipes.

8. In an apparatus of the class described, the combination of a pair of concentric walls arranged to form a film space between them and surround a central space closed at the bottom but open at the top, means for causing a flow of liquid through the said film space, a set of perforated pipes outside of and concentric with the outer wall of the film space, arranged to spray liquid against such wall, means for supplying said pipes with liquid under pressure, a chamber in which the parts described are located arranged to collect the liquid discharged from the perforated pipes, means for supplying a temperature changing liquid medium to the central space surrounded by the film space, a flow wall connected with the upper edge of the inner wall of the film space, over which the liquid medium flows from the said central space, a deflecting plate arranged to receive the liquid from the said flow wall, direct it beyond the concentric set of spray pipes and deliver it into the said collecting chamber.

9. In apparatus of the class described, the combination of a pair of concentric cylinders the walls of which co-operate to form a film space for liquid between them, means for supplying a liquid to the lower end of the film space, a trough surrounding the upper end of the outer cylinder and arranged to receive the liquid flowing from the upper end of the film space, a main cylinder in which said pair of cylinders is supported, means within said main cylinder for spraying a temperature changing medium against the outer cylinder of said pair of cylinders, and a cover extending between said trough and the side wall of said main cylinder.

10. In apparatus of the class described, the combination of a pair of cylinders the walls of which co-operate to form a liquid space between them, means for supplying milk to one end of the film space, a trough carried by the outer cylinder and arranged to receive liquid flowing from the other end of the film space, a main cylinder surrounding said pair of cylinders, means arranged within said main cylinder for spraying a temperature changing medium against the wall of the outer cylinder of said pair of cylinders, and an annular plate surrounding the outer cylinder of said pair of cylinders and extending from the side wall of said trough to the wall of said main cylinder.

11. In apparatus of the class described, the combination of a pair of cylinders the walls of which co-operate to form a film space between them, means for supplying liquid to the lower end of the film space, a trough surrounding the outer cylinder and arranged to receive liquid delivered from the other end of the film space, a main cylinder surrounding said pair of cylinders, means for circulating a temperature changing medium relative to the walls of said pair of cylinders, a guard extending over said trough to conduct the temperature changing medium flowing from the inner cylinder of said pair of cylinders to said main cylinder, and an annular plate surrounding said trough and arranged to receive the temperature changing medium flowing over said guard, said plate being formed with apertures through which the medium flows to said main cylinder.

12. In apparatus of the class described, the combination of a pair of cylinders the walls of which co-operate to form a film space between them, means for supplying liquid to one end of the film space, a trough carried by the outer cylinder and arranged to receive liquid flowing from the other end of the film space, a main cylinder surrounding said pair of cylinders, means for supplying a temperature changing medium around the outer one of said pair of cylinders and to said inner cylinder, and annular means between the upper ends of said inner cylinder and main cylinder arranged to conduct the medium from said inner cylinder over said trough and discharge it into said main cylinder outside the means which supply the temperature changing medium to said outer cylinder of said pair of cylinders.

13. In apparatus of the class described, the combination of a pair of cylinders the walls of which co-operate to form a film space between them, means for supplying liquid to one end of the film space, a trough carried by the outer cylinder and arranged to receive liquid flowing from the other end of the film space, a main cylinder surrounding said pair of cylinders, means for supplying a temperature changing medium to said inner cylinder, an annular series of perforated pipes arranged within said main cylinder and extending longitudinally of said pair of cylinders for supplying the temperature changing medium to the outer one thereof, and annular means between the upper ends of said inner cylinder and main cylinder arranged to conduct the medium from said inner cylinder over said trough and discharge it into said main cylinder outside the supply of the medium to said outer cylinder of said pair of cylinders.

14. In apparatus of the class described, the combination of a pair of cylinders the walls of which co-operate to form a film space between them, means for supplying liquid to one end of the film space, a trough carried by the outer cylinder and arranged to receive liquid flowing from the other end of the film space, a main cylinder surrounding said pair of cylinders, means for supplying a temperature changing medium around the outer one of said pair of cylinders and to said inner cylinder, and a pair of annular plates between the upper ends of said inner cylinder and main cylinder arranged to conduct the medium from said inner cylinder over said trough and discharge it into said main cylinder outside the supply of the medium to said outer cylinder of said pair of cylinders.

In testimony whereof I have hereunto signed my name.

HARVEY H. MILLER.